(12) United States Patent
Vittur

(10) Patent No.: US 11,608,466 B2
(45) Date of Patent: Mar. 21, 2023

(54) SOLID DRAG REDUCTION ADDITIVE AND METHOD OF USING SAME

(71) Applicant: Baker Hughes Oilfield Operations LLC, Houston, TX (US)

(72) Inventor: Brandon M. Vittur, Sugar Land, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/214,164

(22) Filed: Mar. 26, 2021

(65) Prior Publication Data
US 2022/0306930 A1  Sep. 29, 2022

(51) Int. Cl.
*C10G 71/00*  (2006.01)
*C09K 8/60*  (2006.01)

(52) U.S. Cl.
CPC .............. *C09K 8/604* (2013.01); *C10G 71/00* (2013.01); *C09K 2208/28* (2013.01); *C10G 2300/4075* (2013.01)

(58) Field of Classification Search
CPC .... C09K 8/604; C09K 2208/28; C10G 71/00; C10G 2300/4075
See application file for complete search history.

(56) References Cited

U.S. PATENT DOCUMENTS

| 5,539,044 A * | 7/1996 | Dindi ...................... C08F 10/00 524/579 |
| 2006/0148928 A1* | 7/2006 | Harris ....................... F17D 1/17 523/175 |
| 2008/0064785 A1 | 3/2008 | Martin et al. |
| 2008/0149530 A1* | 6/2008 | Milligan .............. C10M 145/14 208/40 |
| 2009/0107554 A1* | 4/2009 | Milligan .............. B01J 19/2435 524/394 |
| 2009/0111714 A1 | 4/2009 | Burden et al. |
| 2014/0323366 A1 | 10/2014 | Parnell et al. |
| 2015/0101673 A1 | 4/2015 | Milligan |

FOREIGN PATENT DOCUMENTS

CN   104817657 B   3/2017

* cited by examiner

*Primary Examiner* — Kumar R Bhushan
(74) *Attorney, Agent, or Firm* — Crowe & Dunlevy, P.C.

(57) ABSTRACT

Methods of reducing drag in a flowing hydrocarbon include introducing to the flowing hydrocarbon an amount of a solid drag reducing additive effective to improve the flow, the solid drag reducing additive including a polymer particle prepared from at least one polar monomer and a percent by weight (wt %) of liquid of 50 wt % or less. Methods also include producing a solid drag reducing additive that includes forming a polymer from at least one polar monomer by emulsion polymerization; and disrupting the emulsion by adding at least one demulsifier and at least one anti-blocking agent to form the solid drag reducing additive. Compositions include a solid drag reducing additive comprising a polymer prepared from at least one polar monomer and having an average particle size in a range of about 100 μm to about 500 μm, wherein the solid drag reducing additive comprises less than 50 wt % of liquid.

16 Claims, No Drawings

SOLID DRAG REDUCTION ADDITIVE AND METHOD OF USING SAME

FIELD

This application relates to drag reduction additive compositions for improving the flow of fluids, including heavy oils, through conduit and other forms of fluid transport. Particularly, drag reduction additive compositions may be used to treat heavy oils to reduce viscosity, increase throughput, reduce power consumption, and/or reduce the need for diluent and other solvents.

BACKGROUND

Drag reducing additives are used in pipelines and other fluid transport systems to increase capacity and flow rates by reducing turbulence and friction (drag). Drag reducing additives can include high molecular weight polymers and other components that are prepared as slurries or dispersions in water and/or organics non-solvents that are dispensed and dissolved into fluids carried by a pipe. However, additional liquids and non-solvents add cost to a drag reducing additive product without directly adding to or improving drag reduction performance.

Solvents added to suspend drag reducing additives can also limit the number of potential applications. For example, water-based products, while cheaper, cannot be added to finished fuel streams. Moreover, for low API gravity and asphaltene-containing hydrocarbons, such as heavy crude oils, conventional drag reduction additives do not perform well. For the limited types of drag reduction additives that are soluble in heavy crude oils, such additives are often formulated as emulsions. Accordingly, there is a need for alternative forms of drag reducing additives that can improve the flow of heavy crude oils and that can be conveniently and economically shipped, stored, and/or used.

BRIEF DESCRIPTION

In an aspect, the present disclosure provide methods of reducing drag in a flowing hydrocarbon, that include: introducing to the flowing hydrocarbon an amount of a solid drag reducing additive effective to improve the flow, the solid drag reducing additive comprising a polymer particle prepared from at least one polar monomer and a percent by weight (wt %) of liquid of 50 wt % or less In another aspect, the present disclosure provides methods of producing a solid drag reducing additive, including: forming a polymer from at least one polar monomer by emulsion polymerization; disrupting the emulsion by adding at least one demulsifier and at least one anti-blocking agent to form the solid drag reducing additive; isolating the solid drag reducing additive; and drying the solid drag reducing additive to 50 wt % or less of liquid.

In another aspect, the present disclosure provides compositions that include a solid drag reducing additive comprising a polymer prepared from at least one polar monomer and having an average particle size in a range of about 100 µm to about 500 µm, wherein the solid drag reducing additive comprises less than 50 wt % of liquid.

DETAILED DESCRIPTION

Methods and compositions disclosed herein are directed to the application and production of solid drag reducing additives for enhancing flow in hydrocarbon transport systems, including those used to transport and process heavy crude oils. Solid drag reducing additives can increases the throughput of pipelines, reduce pressure drop and/or reduce the power consumed during transport, and reduce or eliminate the need for diluents, solvents, and other viscosity modifiers.

Solid drag reducing additives disclosed herein can be used for any hydrocarbon stream, including heavy and crude oils having low to intermediate API gravity such as heavy crude oil containing various levels of asphaltenes, oils with high bitumen contents, and the like. As used herein, the term "API gravity" is defined as the specific gravity scale developed by the American Petroleum Institute (API) for measuring the relative density of various petroleum liquids. API gravity of a liquid hydrocarbon can be determined according to ASTM test method D1298-12b (2017), and according the following formula: API gravity=(141.5/SG at 60° F.)−131.5, where SG is the specific gravity of the liquid hydrocarbon at 60° F. In some embodiments, drag reducing additives disclosed herein may be used to treat heavy crudes, including heavy oils having an API gravity of 26 or less, such as in a range of about 26 to about 10, and having varying concentrations of asphaltenes, such as at a percent by weight (wt %) of about 5 wt % or greater. Further, while the solid drag reducing additives are useful for crude production streams, the additives can also be applied to other types of hydrocarbon streams, including refined and product streams.

Solid drag reducing additives can be added directly to a hydrocarbon stream to improve flow, and are not limited by the concentration of a carrier solution, such as a solvent system or emulsion. In addition to reducing the costs for storage and transport, solid drag reducing additives can be employed in cold climates where aqueous solvent systems and emulsions would freeze and become unusable. In some embodiments, solid drag reducing additives can be mixed with a carrier fluid with a lower freeze point than water.

Synthesis of Drag Reducing Additives

Solid drag reducing additives disclosed herein may be prepared by emulsion polymerization in a mixture of one or more polar monomers, a continuous phase, at least one surfactant, and an initiation system. In some embodiments, the continuous phase is an aqueous fluid, such as water, polar organic liquids, and mixtures thereof. The discontinuous phase can include the one or more polar monomers and optionally a non-aqueous solvent. Following the formation of the emulsion, polymerization is initiated by any stimulus suitable to activate the initiation system, such as temperature, pH, disruption of an encapsulant surrounding the initiator, and the like.

Surfactants disclosed herein can include any suitable surfactant for stabilizing the polar monomers in the emulsion, and can include ionic and nonionic surfactants. Examples of suitable surfactants may include, but are not limited to, alkyl sulfates such as sodium lauryl sulfate, alkyl ether sulfates, dialkyl sulfosuccinates, alkyl phosphates such as 2-ethylhexyl polyphosphate, alkyl aryl sulfonates such as sodium dodecylbenzene sulfonate, sarcosinates such as sodium lauroylsarcosinic, and the like, and any combination thereof. Examples of nonionic surfactants may include, but are not limited to, sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates, and any combination thereof. Ionic and nonionic surfactants may be used in combination.

Polymerization initiation systems can include any suitable compound for initiating polymerization of the polar monomer, including free-radical initiators. Examples of free radical initiators may include, but are not limited to, persulfates such as ammonium persulfate, sodium persulfate, and potassium persulfate; peroxy persulfates; peroxides such as tert-butyl hydroperoxide. Free radical initiators can be used alone or in combination with one or more reducing components and/or accelerators; and the like; and any combination thereof. Possible reducing components may include, but are not limited to, bisulfites, metabisulfites, ascorbic acid, erythorbic acid, and sodium formaldehyde sulfoxylate. Possible accelerators may include, but are not limited to, any composition containing a transition metal having two oxidation states such as ferrous sulfate and ferrous ammonium sulfate. Other initiation systems can include thermal and radiation initiation techniques that generate free radicals.

Following synthesis, the solid drag reducing additive is obtained by disrupting the emulsified polymer mixture using a demulsifier, which may be done in combination with an anti-blocking agent to control the particle size of the solid polymer and prevent agglomeration of solids. The solid drag reducing additive can then be obtained as a solid or as a concentrated slurry by any suitable method, including the use of settling tanks, filtration techniques including drum filters, and the like, and any combination thereof.

Residual fluids and solvents can be removed from the solid drag reducing additive by drying, which can include one or more of spray drying, flash drying, or rotating disc drying. In some embodiments, solid drag reducing additives can include a liquid concentration at a percent by weight (wt %) of 50 wt % or less, 10 wt % or less, or 5 wt % or less. In some embodiments, the liquid can be present at a wt % in an amount ranging from 5 wt % to 50 wt %, or from 5 wt % to 10 wt %.

Drag Reducing Additive

Drag reducing additives disclosed herein can include polymers prepared from one or more polar monomers. In some embodiments, drag reducing additives can also include random and block copolymers. Examples of suitable polar monomers include acrylates or methacrylates.

In one embodiment of the present invention, the drag reducing polymer can comprise a plurality of repeating units of the residues of one or more of the monomers selected from the group consisting of:

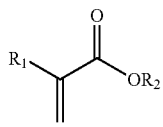

wherein R1 is hydrogen or a C1-C10 alkyl, and R2 is hydrogen or a C1-15 linear or branched alkyl. Representative methacrylic- and acrylic-based monomers also include, but are not limited to, methyl methacrylate, ethyl methacrylate, butyl methacrylate, methyl acrylate, butyl acrylate, cyclohexyl acrylate, benzyl methacrylate, dimethylaminoethyl methacrylate, benzyl acrylate, dimethylaminoethyl acrylate, hexyl acrylate, 2-ethylhexyl acrylate, lauryl acrylate, ethyl acrylate, diethylene glycol dimethacrylate, dicyclopentadienyloxyethyl methacrylate, 2-ethylhexyl methacrylate, hexyl methacrylate, cyclohexyl methacrylate, lauryl methacrylate, tetrahydrofuryl methacrylate, methacrylic acid, acrylic acid, acrylonitrile, methacrylonitrile, glycidyl methacrylate, cyanoacrylate, acrylamide, methacrylamide, and the like, and any combination thereof.

Solid drag reducing agents disclosed herein may have an average particle size (d50) of 1,000 μm or less. In some embodiments, solid drag reducing agents may have a d50 in a range of about 50 μm to about 750 μm, about 75 μm to about 600 μm, or about 100 μm to about 500 μm.

Solid drag reducing additives disclosed herein can be added to the liquid hydrocarbon at a parts per million by weight (ppmw) of in the range from about 10 ppmw to about 100 ppmw. In some embodiments, the solid drag reducing additive may be added at a concentration of at least 500 ppmw, at least 550 ppmw, or at least 600 ppmw.

Solid drag reducing additives disclosed herein can added to a flowing hydrocarbon at a concentration sufficient to provide a percent drag reduction over an untreated stream of at least about 5%, at least 10%, or at least 20%.

Demulsifier

Demulsifiers disclosed herein may be added during or following an emulsion polymerization of a solid drag reducing additive to destabilize and partition the emulsion to its constituent phases. Demulsifiers include compounds that are soluble in a continuous aqueous phase and added following the initiation of polymerization of the drag reducing additive to disrupt the discontinuous phase and initiate precipitation of the formed polymer.

Demulsifiers can include low molecular weight alcohols that disrupt micelles within an emulsion including C1-C7 alcohols, including mono- and poly-alcohols, such as ethanol, propanol, butanol, pentanol, hexanol, glycols, and combinations thereof; polyalkoxylated alcohols; polyethylene glycols; polyethylene oxides, polypropylene oxides; polyoxyalkylene alcohols; alkyl amines; oxyalkylated polyamines; C3-C8 ketones such as acetone and methyl ethyl ketone; and aldehydes such as alkylphenol formaldehyde resin alkoxylates, alkoxylated alkylphenol formaldehyde resins, alkoxylated amine-modified alkylphenol formaldehyde resins, and the like. While a number of demulsifiers are described herein it is envisioned that other demulsifiers that are compatible with an aqueous continuous phase and capable of initiating precipitation of the polymerized drag reducing agents can be applied similarly by those skilled in the art.

Anti-Blocking Agent

Anti-blocking agents disclosed herein can be added to an emulsion during or following an emulsion synthesis of a solid drag reducing agent to control the formation of polymer particles and prevent the formation of large insoluble aggregates. Anti-blocking agents disclosed herein may include, but are not limited to, one or more of fatty acids having 12-20 carbon atoms and salts thereof, such as magnesium stearate or calcium stearate; polyethylene glycol; alkoxylated glycols such as methoxylated polyethylene glycol; polyethylene wax; stearamide; ethylene-bis-stearamide; inorganic clays such as attapulgite; silicones; and the like; and any combination thereof.

Anti-blocking agents can be added to an emulsion at a molar ratio of anti-blocking agent to monomer/polymer of about 0.1 or greater, and in some embodiments in a range of about 0.1 to about 1.0.

Carrier Fluid

Solid drag reducing agents can be combined with a carrier fluid in some embodiment to form a slurry or suspension. Carrier fluids may have a low freeze point for some applications, and may aid handling and metering of a solid drag reducing agent to a fluid system. Carrier fluids can include glycerol; ethylene glycol; propylene glycol; diethylene glycol; dipropylene glycol; methyl ethers of glycol; and the like; and any combination thereof. More than one carrier fluid can be used in some embodiments.

Carrier fluids disclosed herein can be added to a solid drag reducing agent at a percent by weight (wt %) in a range of about 10 wt % to about 50 wt %, or from about 10 wt % to about 30 wt % in some embodiments.

Applications

Addition of a solid drag reduction additive to a hydrocarbon stream may include providing the solids by gravity, such as from a hopper or other storage vessel. In some embodiments, solids addition may include the use of Venturi-type devices such as eductors or extenders that utilize fluid flow to draw the solid drag reduction additive into a flowing stream. Pressure assisted and pneumatic solids transfer methods can also be used to provide the solid drag reduction additives to a hydrocarbon stream. For example, a pressurized gas such as compressed air or nitrogen can be used to deliver a solid drag reduction additive, including in applications in which a hydrocarbon stream is flowing within a closed or partially closed fluid system.

Other techniques for delivering the solid drag reduction additive can include diverting a fraction of a flowing hydrocarbon stream to a separate tank or vessel, mixing a solid drag reducing additive with the fraction to form a slurry or concentrate, and re-directing the slurry or concentrate back into the hydrocarbon stream.

To facilitate a better understanding of the embodiments of the present invention, the following examples of preferred or representative embodiments are given. In no way should the following examples be read to limit, or to define, the scope of the invention.

The present disclosure provides, among others, the following aspects, each of which may be considered as optionally including any alternate thereof.

Clause 1: A method of reducing drag in a flowing hydrocarbon, comprising: introducing to the flowing hydrocarbon an amount of a solid drag reducing additive effective to improve the flow, the solid drag reducing additive comprising a polymer particle prepared from at least one polar monomer and a percent by weight (wt %) of liquid of 50 wt % or less.

Clause 2: The method of clause 1 wherein the percent by weight (wt %) of liquid is 10 wt % or less.

Clause 3: The method of clause 1, wherein the hydrocarbon has an API gravity of 26 or less.

Clause 4: The method of clause 1, wherein the solid drag reducing additive has an average particles size in a range of about 100 µm to about 500 µm.

Clause 5: Them method of clause 1, wherein the polar monomer has the general formula of:

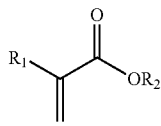

wherein $R_1$ is hydrogen or a C1-C10 alkyl, and $R_2$ is hydrogen or a C1-15 alkyl.

Clause 6: The method of clause 1, wherein the polar monomer comprises a branched alkyl substituent.

Clause 7: The method of clause 1, wherein the solid drag reducing additive is added to the flowing hydrocarbon at a parts per million by weight of about 10 ppmw to 100 ppmw.

Clause 8: The method of clause 1, wherein introducing comprises adding the solid drag reducing additive by gravity feed to the flowing hydrocarbon.

Clause 9: The method of clause 1, wherein introducing comprises adding the solid drag reducing additive by pneumatic feed to the flowing hydrocarbon.

Clause 10: The method of clause 1, wherein introducing comprises obtaining a fraction of the flowing hydrocarbon, combining the solid drag reducing additive with the fraction to obtain a slurry or concentrate, and introducing the slurry or concentrate to the flowing hydrocarbon.

Clause 11: The method of clause 1, wherein the drag in the flowing hydrocarbon is reduced by at least 5% when compared to the flowing hydrocarbon before introduction of the solid drag reducing additive.

Clause 12: A method of producing a solid drag reducing additive, comprising: forming a polymer from at least one polar monomer by emulsion polymerization; disrupting the emulsion by adding at least one demulsifier and at least one anti-blocking agent to form the solid drag reducing additive; isolating the solid drag reducing additive; and drying the solid drag reducing additive to 50 wt % or less of liquid.

Clause 13: The method of clause 12, wherein the anti-blocking agent comprises one or more selected from a group consisting of fatty acids having 12-20 carbon atoms, polyethylene glycol, methoxylated polyethylene glycol, a polyethylene wax, stearamide, ethylene-bis-stearamide, an inorganic clay, and a silicone.

Clause 14: The method of clause 12, wherein the solid drag reducing additive comprises 10 wt % or less of the liquid.

Clause 15: The method of clause 12, wherein the ratio of the anti-blocking agent to the solid drag reducing additive is in the range of 0.1 to 1.

Clause 16: The method of clause 12, wherein the demulsifier comprises a C1-C7 alcohol.

Clause 17: A composition, comprising: a solid drag reducing additive comprising a polymer prepared from at least one polar monomer and having an average particle size in a range of about 100 µm to about 500 µm, wherein the solid drag reducing additive comprises less than 50 wt % of liquid.

Clause 18: The composition of clause 17, further comprising a heavy crude oil having an API of 26 or less.

Clause 19: The composition of clause 17, wherein the solid drag reducing additive comprises 10 wt % or less of the liquid.

Clause 20: The composition of clause 17, wherein the polar monomer has the general formula of:

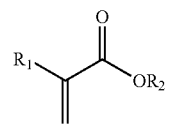

wherein $R_1$ is hydrogen or a C1-C10 alkyl, and $R_2$ is hydrogen or a C1-15 alkyl.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure. While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method of reducing drag in a flowing hydrocarbon, comprising:
   introducing to the flowing hydrocarbon an amount of a solid drag reducing additive effective to improve the flow, the solid drag reducing additive comprising a polymer particle prepared from at least one polar monomer and a percent by weight (wt %) of water of 10 wt % or less.

2. The method of claim 1 wherein the percent by weight (wt %) of water is 5 wt % or less.

3. The method of claim 1, wherein the solid drag reducing additive has an average particles size in a range of about 100 μm to about 500 μm.

4. The method of claim 1, wherein the at least one polar monomer has the general formula of:

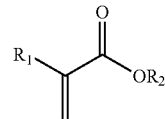

wherein $R_1$ is hydrogen or a C1-C10 alkyl, and $R_2$ is hydrogen or a C1-15 alkyl.

5. The method of claim 1, wherein the polar monomer comprises a branched alkyl substituent.

6. The method of claim 1, wherein the solid drag reducing additive is added to the flowing hydrocarbon at a parts per million by weight of about 10 ppmw to 100 ppmw.

7. The method of claim 1, wherein introducing comprises adding the solid drag reducing additive by gravity feed to the flowing hydrocarbon.

8. The method of claim 1, wherein introducing comprises obtaining a fraction of the flowing hydrocarbon, combining the solid drag reducing additive with the fraction to obtain a slurry or concentrate, and introducing the slurry or concentrate to the flowing hydrocarbon.

9. The method of claim 1, wherein the drag in the flowing hydrocarbon is reduced by at least 5% when compared to the flowing hydrocarbon before introduction of the solid drag reducing additive.

10. A method of reducing drag in a flowing hydrocarbon, comprising:
    introducing to the flowing hydrocarbon an amount of a solid drag reducing additive effective to improve the flow, the solid drag reducing additive comprising a polymer particle prepared from at least one polar monomer and a percent by weight (wt. %) of water of 10 wt % or less, where the at least one polar monomer has the general formula of:

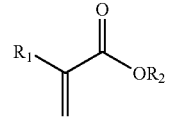

wherein $R_1$ is hydrogen or a C1-C10 alkyl, and $R_2$ is hydrogen or a C1-15 alkyl;
wherein the drag in the flowing hydrocarbon is reduced by at least 5% when compared to the flowing hydrocarbon before introduction of the solid drag reducing additive.

11. The method of claim 10 wherein the percent by weight (wt %) of water is 5 wt % or less.

12. The method of claim 10, wherein the solid drag reducing additive has an average particles size in a range of about 100 μm to about 500 μm.

13. The method of claim 10, wherein the polar monomer comprises a branched alkyl substituent.

14. The method of claim 10, wherein the solid drag reducing additive is added to the flowing hydrocarbon at a parts per million by weight of about 10 ppmw to 100 ppmw.

15. The method of claim 10, wherein introducing comprises adding the solid drag reducing additive by gravity feed to the flowing hydrocarbon.

16. The method of claim 10, wherein introducing comprises obtaining a fraction of the flowing hydrocarbon, combining the solid drag reducing additive with the fraction to obtain a slurry or concentrate, and introducing the slurry or concentrate to the flowing hydrocarbon.

\* \* \* \* \*